United States Patent [19]

Meyer et al.

[11] 4,233,869

[45] Nov. 18, 1980

[54] APPARATUS FOR SLITTING WEBS OF MATERIAL

[75] Inventors: Rolf Meyer; Herbert Schönmeier, both of Düsseldorf, Fed. Rep. of Germany

[73] Assignee: Jagenberg-Werke Aktiengesellschaft, Düsseldorf, Fed. Rep. of Germany

[21] Appl. No.: 46,404

[22] Filed: Jun. 6, 1979

[30] Foreign Application Priority Data

Jun. 7, 1978 [DE] Fed. Rep. of Germany ....... 2824900

[51] Int. Cl.³ .......................... B26D 7/26; B23D 19/06

[52] U.S. Cl. ........................................ 83/500; 83/102; 83/105; 83/433

[58] Field of Search .......... 83/105, 107, 102, 500-503, 83/505, 433

[56] References Cited

U.S. PATENT DOCUMENTS 3,072,353 1/1963 Moser ............................... 83/105 X

*Primary Examiner*—J. M. Meister

*Attorney, Agent, or Firm*—Sprung, Felfe, Horn, Lynch & Kramer

[57] ABSTRACT

An apparatus for the longitudinal cutting of webs of material into individual strips has a plurality of cutter pairs consisting of a lower cutter and an upper cutter and disposed side by side. The spreading of the material on its width and the spreading apart of the strips of material after cutting is brought about solely by the mounting of the cutter pairs in an arc along the direction perpendicular to the direction of travel of the web and by the tilting movement of the cutter pairs into the plane of movement of the web of material.

8 Claims, 5 Drawing Figures

APPARATUS FOR SLITTING WEBS OF MATERIAL

BACKGROUND

The invention relates to an apparatus for the longitudinal cutting of webs of material into individual strips of material, which has a plurality of cutter pairs consisting of lower cutters and upper cutters, as well as means for the width-wise spreading of the web of material and for cutting apart the strips of material.

In a known apparatus of this kind, the cutter pairs are disposed on straight rails disposed parallel one above the other. For the purpose of adjustment to the widths desired in the strips of material, the cutter pairs are displaceable and fixable on the rails. To enable the web of material to be cut in a wrinkle-free manner and draw the cut strips of material apart, a spreader roll is provided both in front of and behind each cutter pair. These spreader rolls can be swung to a greater or lesser degree into the plane of the movement of the web of material according to the desired degree of spreading and separation.

SUMMARY OF THE INVENTION

The object of the invention is to create an apparatus of the above kind which will make it possible by simpler means to accomplish a wrinkle-free cutting of the web of material and a separation of the strips of the material.

This object is accomplished in accordance with the invention by disposing the cutter pairs in an arc and making them pivotable into the plane of movement of the web in the manner of a spreader roll for the purpose of spreading and separation.

Since in the invention the cutter pairs themselves spread the incoming web of material and separate the strips of material, the apparatus of the invention requires no additional spreader rolls for the incoming web of material and the outgoing strips of material. In this manner the cost involved in the construction of the apparatus becomes comparatively low.

Preferably, one cutter of each pair, especially the lower cutter, is cylindrical, in a known manner. The cylindrical shape of the cutter assures that the web of material will be provided with broad support.

So as to assure this broad support over virtually the entire width of the web of material, the cylindrical cutters are disposed as closely together as possible, in accordance with a further development of the invention. Even in the case of cylindrical cutters disposed closely adjacent one another, a maximum of freedom can nevertheless be provided in the width adjustment if the cylindrical cutter has a plurality of cutting edges. This can be brought about, for example, by providing the cylindrical cutter with annular grooves.

According to a further development of the invention, the supports of the cutters have carriages which are displaceable and fixable on arcuate rails.

The cutter pairs are advantageously disposed in a frame which is tiltable at both of its ends in supporting standards. One end of the frame can bear a crown gear meshing with a pinion on a servomotor. In this manner it is easily possible to bring about the desired tilt of the cutter pairs.

BRIEF DESCRIPTION OF THE DRAWINGS

The invention will be further explained with the aid of the appended drawing representing an example of its embodiment, wherein.

DETAILED DESCRIPTION OF THE INVENTION

Figure 1:
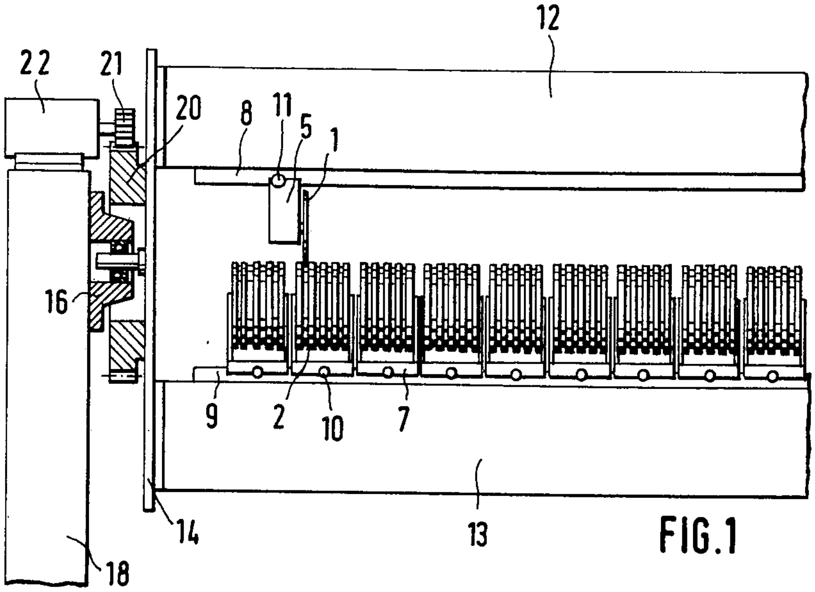
FIG. 1 is a front elevational view of the slitting apparatus.
Figure 2:
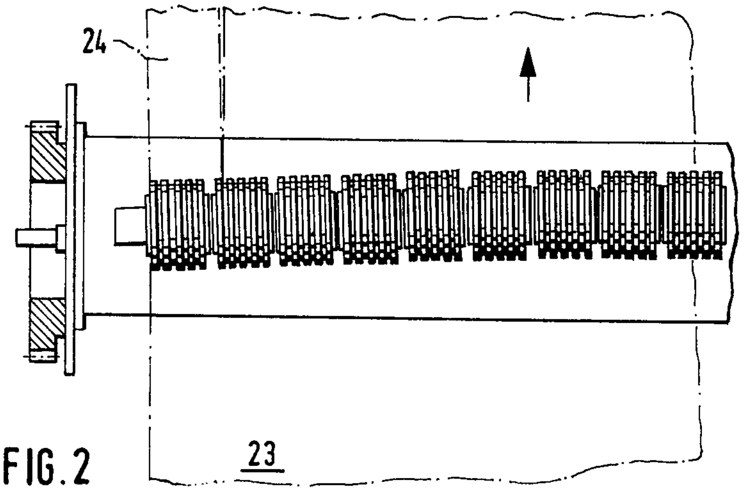
FIG. 2 is a top plan view of the apparatus of FIG. 1.
Figure 3:
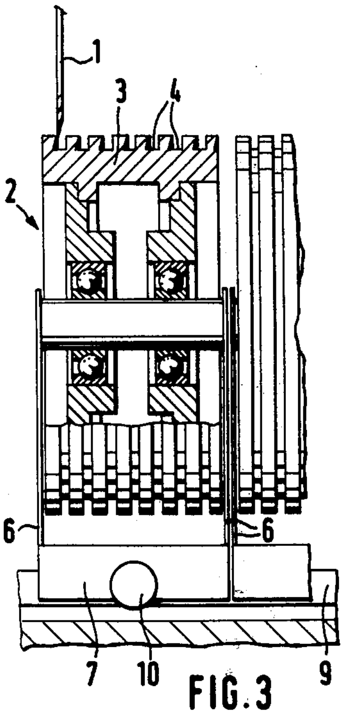
FIG. 3 is an enlarged cross-sectional view of a cutter pair of the apparatus of FIG. 1.
Figure 4:
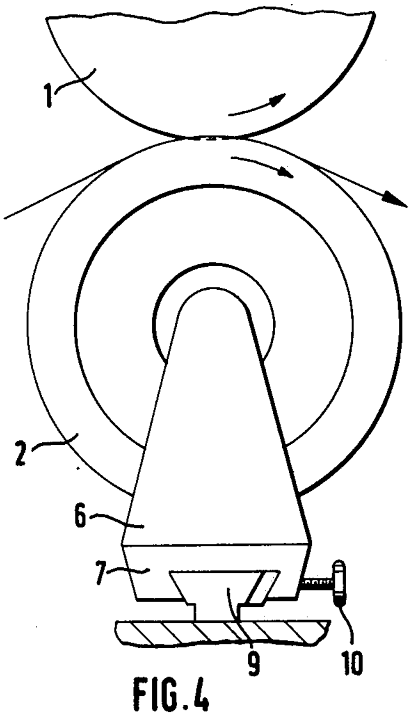
FIG. 4 is a side elevational view of a cutter pair of the apparatus of FIG. 3.
Figure 5:
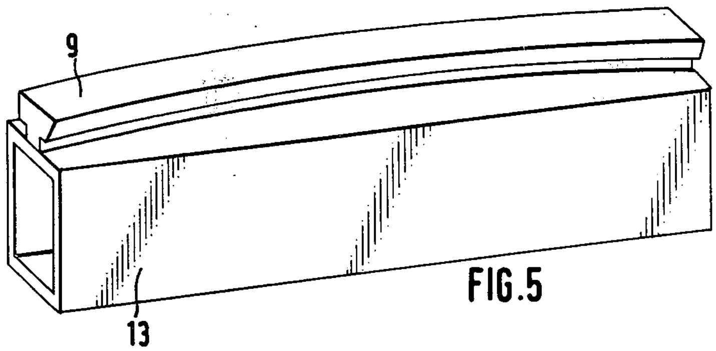
FIG. 5 is a perspective view of an arcuate guide rail.

The apparatus consists of a plurality of cutter pairs 1–2, which are represented diagrammatically in FIGS. 1 and 2 and in detail in FIGS. 3 and 4. The upper cutter 1 is a flat circular knife, while the lower cutter 2 comprises a cylindrical barrel 3 on which there is a plurality of annular grooves 4 whose edges are cutting edges. The upper cutter 1 is mounted rotatably on an upper cutter support 5, while the lower cutter 2 is mounted centrally between the plates 6 held upright in a base 7.

The supports 5 and bases 7 are constructed as carriages which are displaceable along arcuate dovetail rails 8 and 9, respectively. By means of the set screws 10 and 11, the upper cutter supports and the lower cutter bases, respectively, can be set at the desired point along the rails 8 and 9. The rails 8 and 9 are disposed on crossbeams 12 and 13, respectively, fastened at their extremities to an end plate 14. The crossbeams 12 and 13 and the end plate 14 form with a similar end plate on the other side of the machine a frame which can be tilted in bearings 16 on the standard 18. For this purpose one end plate 14 bears a crown gear 20 which meshes with a pinion 21 of a servomotor 22.

By the tilting of the frame 12, 13, 14, the cutter system forming an arc is tilted to a greater or lesser degree in the plane of movement of the web of material 23, for the purpose of obtaining the desired effect of spreading the web 23 on its width and separating the individual strips of material 24.

The arcuate rails 8 and 9 may have a radius of curvature according to the working-width of from 0.4% to 1.2% and preferably 0.6% to 0.7%. The tilting of the crossbeams 12 and 13 may vary from 0° to ±15° preferably +7° to −7° for the preferable range for the radius of curvature in order to effect efficient spreading of the strips 24.

It will be appreciated that the instant specification and example are set forth by way of illustration and not limitation, and that various modifications and changes may be made without departing from the spirit and scope of the present invention.

What is claimed is:

1. In an apparatus for the longitudinal cutting of webs of material into individual strips, having a plurality of cutting pairs consisting of a lower cutter and an upper cutter and disposed side by side, and means for spreading the meterial on its width and for the spreading apart of the strips of the material, after cutting, the improvement wherein the means for spreading solely comprises means mounting the cutter pairs to be disposed in an arc along the direction perpendicular to the direction of travel of the webs and for the tilting movement of the cutter pairs into the plane of movement of the web of material.

2. The apparatus of claim 1, wherein one cutter of each pair is cylindrical.

3. The apparatus of claim 2, wherein each lower cutter is cylindrical and the cylindrical lower cutters are disposed as closely together as possible.

4. The apparatus of claim 3, wherein the cylindrical lower cutter has a plurality of cutting edges.

5. The apparatus of claim 4, wherein the cylindrical lower cutter has annular grooves therein to form the cutting edges.

6. The apparatus of claim 1, wherein the mounting means includes arcuate guide rails and cutters having carriages which are displaceable and fixable on the arcuate guide rails.

7. The apparatus of claim 1, wherein the mounting means comprises a frame in which the cutter pairs are disposed and which is turnable at its both ends in bearings on standards.

8. The apparatus of claim 7, further comprising means for effecting tilting comprising at one end a crown gear which meshes with a pinion and a servomotor driving the pinion.

* * * * *